United States Patent [19]

Inagaki

[11] Patent Number: 4,551,123
[45] Date of Patent: Nov. 5, 1985

[54] WATER-PROOF PAPER CONTAINER AND ITS MANUFACTURING METHOD

[76] Inventor: Hiromichi Inagaki, 1-143, Aza Maedaomote Inuyama-shi, Aichi, Japan

[21] Appl. No.: 543,319

[22] Filed: Oct. 19, 1983

[51] Int. Cl.$^4$ .............................................. B31B 1/90
[52] U.S. Cl. ..................................... 493/108; 53/174; 493/110
[58] Field of Search ............... 493/103, 108, 109, 110, 493/95; 53/204, 172, 174, 175, 452, 558, 563

[56] References Cited

U.S. PATENT DOCUMENTS

| | | | |
|---|---|---|---|
| 2,286,342 | 6/1942 | Calva | 493/108 |
| 3,383,025 | 5/1968 | Ferrey et al. | 493/108 |
| 4,047,473 | 9/1977 | Fletcher | 493/108 |
| 4,194,440 | 3/1980 | Gorey | 493/108 |
| 4,258,528 | 3/1981 | Focke | 53/174 |

Primary Examiner—Leon Gilden
Attorney, Agent, or Firm—McGlew and Tuttle

[57] ABSTRACT

A container comprises a paper base member covered all around by a heat-shrinkable plastic film. Air is removed from a space formed by the film in which the paper base member is disposed to bring the film against the base member, and at least a part of the film is sealed for closing the space. The base member is either originally formed into the shape of the container, or later formed into the shape of the container to define at least one open end. The open end is covered by a metal lid. A method of making the container includes covering the base member with heat-shrinkable plastic film forming a double wall with the base member in a space between the double wall, removing air from the space between the double wall and sealing the space. Heat applied to the container, for example for sterilizing contents of the container, also shrinks the plastic film to produce a wrinkle-free fit between the film and the paper base member.

7 Claims, 16 Drawing Figures

WATER-PROOF PAPER CONTAINER AND ITS MANUFACTURING METHOD

FIELD AND BACKGROUND OF THE INVENTION

The present invention relates to a container with a water-proof structure, which can be used for retort-sterilization, after a product is supplied to the container, and its manufacturing method.

Sterilizing of a product in a sealed container by applying hot water or steam to the outside of the container is necessary to preserve the product for a long period. One method in this direction is by use of an aluminum or steel can. However, this involves environmental problems because of disposal of empty cans, whose collection costs a lot of money and labor.

Such being the situation, it is proposed that some other containers should replace metal cans. However, as any replacement must be resistant against heat, water content and pressure because of retort-sterilization, nothing has yet been produced to take the place of metal cans.

Glass containers are also generally used, but they are likely to be broken during transportation, are high in weight and cost, and, like metal cans, involve environmental problems.

SUMMARY OF THE INVENTION

The invention comprises a water-proof paper container and its manufacturing method. The container of the invention includes a paper-based cylindrical form with its inside and outside surfaces made water-proof. The hole inside and outside of a cylindrical or box-like container of the invention is covered with heat-shrinkable plastic film, and this container is sealed before the air inside is discharged to the maximum extent. This container can best be used as one in which a product is retort-sterilized after being supplied to the container.

DESCRIPTION OF THE PREFERRED EMBODIMENTS

With reference to the drawings, the invention comprises a container made at least in part of paper with a water-proof structure both inside and outside, which allows for retort-sterilization, and its manufacturing method.

To meet the above requirements, this invention proposes the following procedures: A heat-shrinkable plastic film is formed into a dual tube with a bottom, into which a paper tube is inserted. Then the air inside the dual tube is discharged to the maximum extent, sealing the paper tube in a sandwich manner. The open mouth of the paper tube thus made is equipped with a metal lid in a rolled manner, and hence an air-tight paper container is formed.

Figure 1:
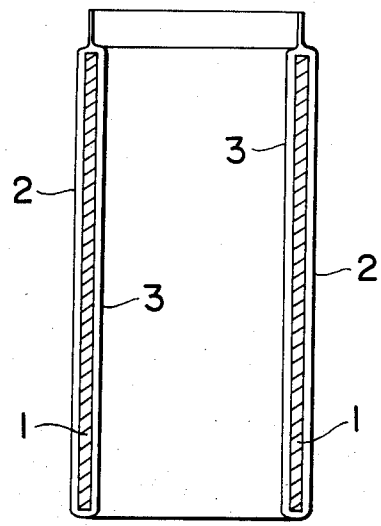
FIG. 1 is a sectional view of the paper container according to the present invention.
Figure 2:
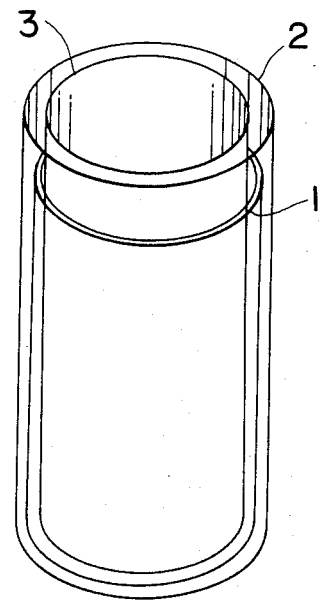
FIG. 2 is a perspective view of a dual heat-shrinkable tube in which a paper tube is placed according to the invention.
Figure 3:
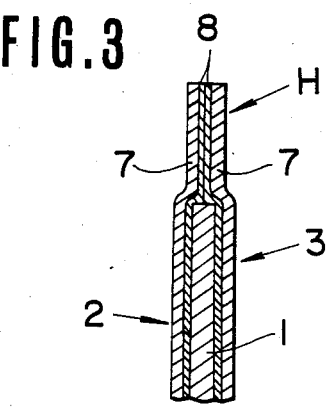
FIG. 3 is a detail sectional view of FIG. 1 showing one end of a paper tube sealed with heat-shrinkable plastic film.

One embodiment of this invention is discussed in detail below. In FIG. 1, a paper tube 1, rolled in a usual spiral manner, is inserted into a dual tube 2,3 made of heat-shrinkable plastic film. Tube 1 is generally of any shape and is here termed a paper base member. After letting air out of the dual tube 2 and 3 in a vacuum device to the maximum extent, the dual tube is heat-sealed, sandwiching the paper tube 1 between the dual tube 2 and 3. In this embodiment, the heat-shrinkable plastic film is heat-shrinkable nylon 7 whose inside is laminated with polyethylene for better heat sealing.

Figure 4:
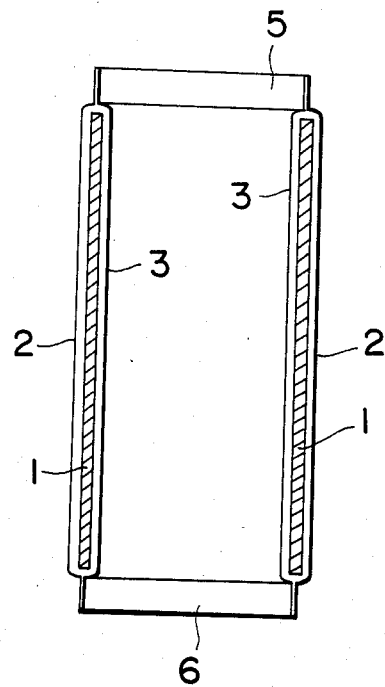
FIG. 4 is a sectional view of a paper tube whose top and bottom are sealed with heat-shrinkable plastic film according to another embodiment of the invention.
Figure 5:
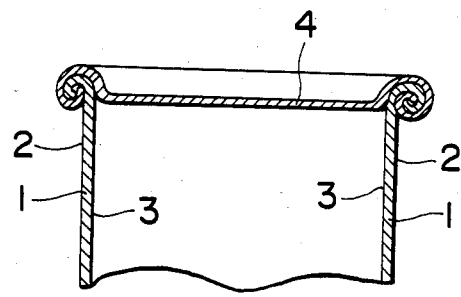
FIG. 5 is a sectional view of a paper container whose mouth is covered with a metal lid in a rolled manner.

Then the paper tube 1 thus structured is equipped with a metal lid each on the upper mouth and the lower mouth in a rolled manner. FIG. 5 depicts a sectional view of a paper tube whose upper mouth is covered with a metal lid in a rolled manner. FIG. 4 shows another embodiment in which the dual tube 2 and 3 is opened both at the top and the bottom, unlike the one with a bottom as illustrated in FIG. 1, and is heat-sealed at both sides 5 and 6.

This embodiment of the invention thus comprises sealed in a dual tube 2 and 3 in a sandwich manner, with the upper and the lower mouth covered with a metal lid in a rolled manner. This paper container, thus perfectly water-proof both inside and outside, can be used for juice and other liquids. As no air is residual inside the dual tube 2 and 3, no problem of paper-film separation or a deformation of the paper tube 1 due to the expansion of any residual amount of air inside the tube 2 and 3, upon retort-sterilization, will occur. Therefore, a paper container of this invention will have a wide range of application.

With heat-shrinkable plastic film being formed into a dual tube under this invention, any heating, due, for example, to retort sterilization, will result in the dual tube shrinking and adhering to the inside and the outside of the paper tube. In this case, the inside film 3 will not shrink centripetally but remain adhering to the inside of the paper tube.

Figure 6:
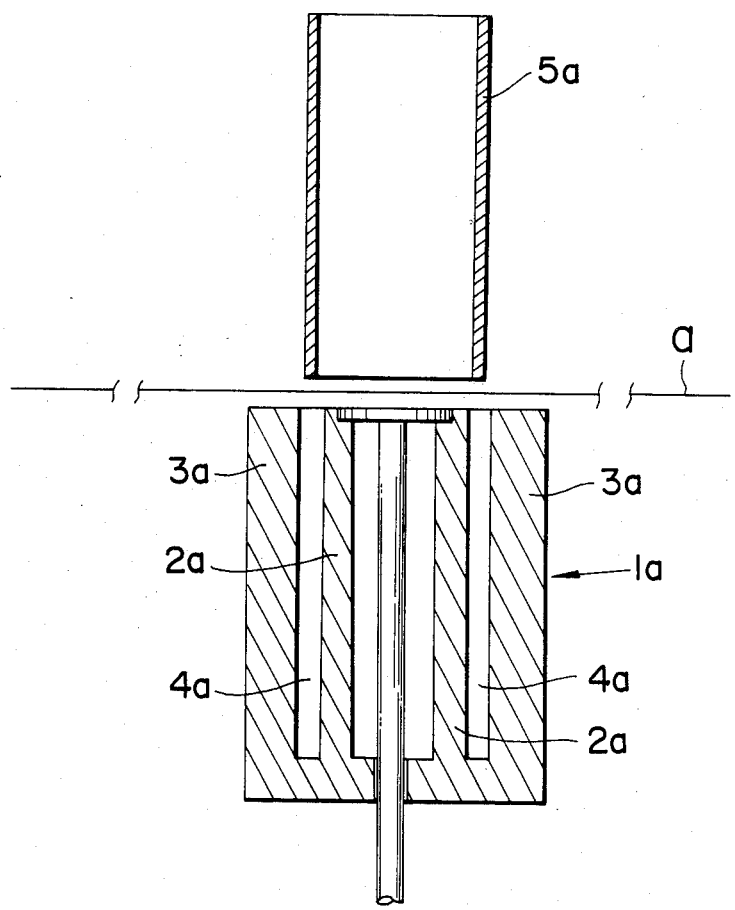
FIG. 6 is a sectional view depicting the relation between a framework of the paper container manufacturing method of this invention and the paper container.
Figure 7:
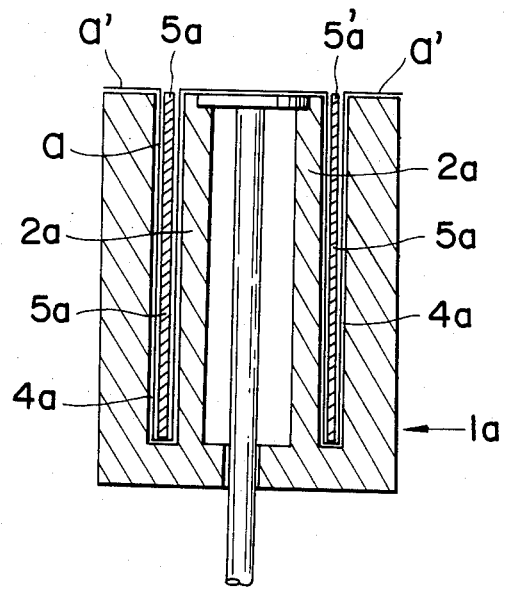
FIG. 7 is a sectional view depicting the paper tube as shown in FIG. 6, together with a plastic film, in the channel of the framework as shown in FIG. 6.
Figure 8:
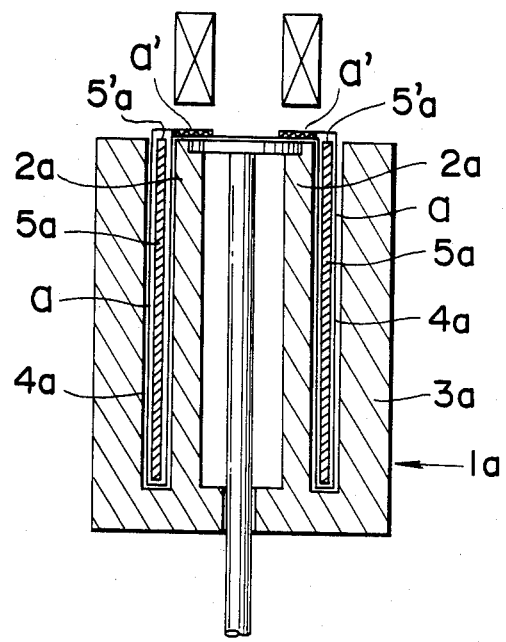
FIG. 8 is a sectional view of the paper container with its bottom heat-sealed as a development from FIG. 7.
Figure 9:
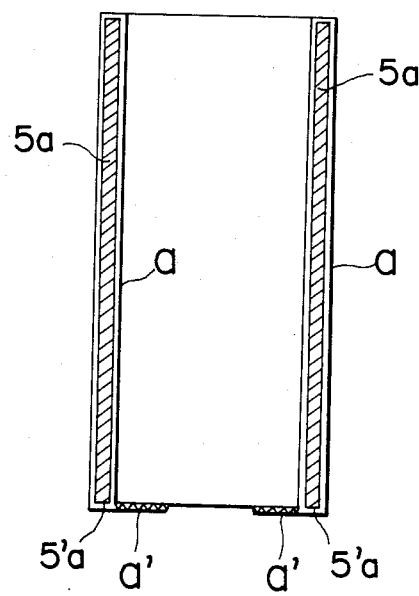
FIG. 9 is a sectional view of the paper container manufactured through the processes in FIGS. 6–8.

FIGS. 6–9 illustrate the actual manufacturing processes of the above-mentioned paper container. In FIG. 6, the plastic film a is introduced over a manufacturing framework 1a, made up of a middle framework 2a and an outer framework 3a. The surface of the plastic film is laminated with polyethylene film. Then, the paper tube 5a, the main body of the paper container, is inserted, as seen in FIG. 7, into the channel 4a formed by the middle framework 2a and the outer framework 3a of the manufacturing framework 1a. As a result, the plastic film a adheres to the outer and the inner surface of the paper tube 5a. At the top of the middle framework 2a, the open mouth of the paper tube 5a is closed with the plastic film a'. Then, as shown in FIG. 8, the edge a of the plastic film a is folded back over the brim 5'a of the paper tube 5a, and heat-sealed. Thus the whole surface of the paper tube 5a is sealed with the plastic film a. During this sealing process, the inside of the dual tube may be evacuated to the maximum possible extent. FIG. 9 presents a sectional view of the paper container thus manufactured. The plastic film a covers all of the paper tube 5a, allowing no part of the paper tube 5a to be exposed to air. Therefore, when filled with juice, this container with its other open mouth covered with a metal lid can replace the conventionl metal cans. In the above-mentioned manufacturing method, wrinkles of the plastic film a appear on both the inner and outer surface of the paper tube 5a. These wrinkles may be neglected when appearing on the inner surface, but cannot be when developing on the outer surface. One measure to solve this problem is, though the covering of the outer surface of the paper tube with decorative paper may work, to use heat-shrinkable material as the plastic film a so as to remove the air inside to the maximum possible extent while the paper tube 5a is being sealed. In this way, the plastic film a adheres to the upper tube 5a and subsequent heating results in the heat-shrinkage of the adhering plastic film a, eliminating the above-mentioned wrinkles.

According to the present invention, the paper tube 5a, or the main body of the paper container, is sealed airtight all over, allowing no part of the container to be exposed to air, and, at the same time, the heat sealed part of the plastic film a constitutes a part of the container's bottom, with no sealed part inside the container. This completely eliminates worries about possible defective sealing, pinholes, etc. Thus it is possible to produce a highly reliable paper container for liquids.

Figure 10:
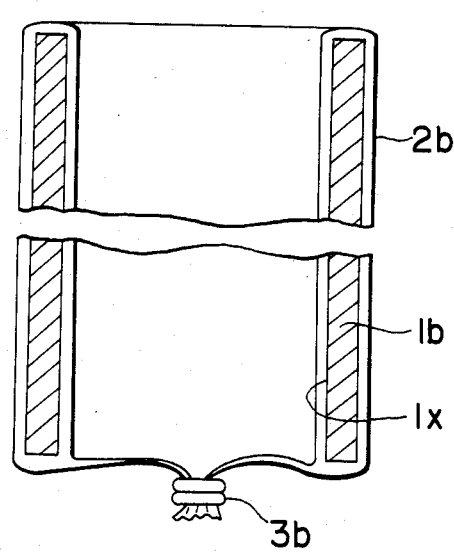
FIG. 10 is a sectional view of a paper container with one mouth of its covering heat-shrinkable plastic film tube clipped.
Figure 11:
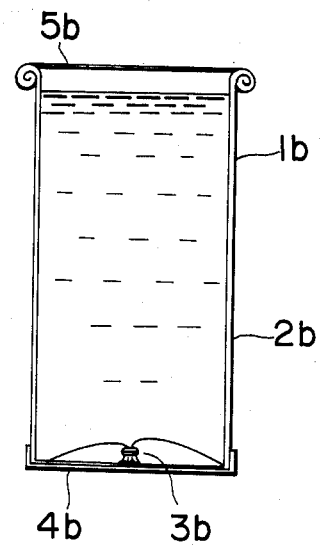
FIG. 11 is a sectional view of a paper container filled with juice.

FIGS. 10 and 11 show another embodiment of a paper container according to this invention. The cylindrically rolled paper body 1b has an aluminum layer 1x laminated to its inside surface. A heat-shrinkable plastic dual tube 2b with a bottom, covering the whole body 1b is provided. The open mouth of the plastic tube 2b is closed by a clip 3b after the air inside is removed to the maximum possible extent.

When a paper container with the above-mentioned structure is heated all over with hot wind or hot water, the plastic tube 2b shrinks, getting rid of wrinkles made during air evacuation. This heating for wrinkle elimination may be conducted before filling a product into the container or at the same time as heating the container for sterilization after filling in the product.

FIG. 11 indicates a sectional view of a paper container after containing a commercial product and having its both open mouths sealed. The open mouth that is closed with the clip 3b is covered with a decorative bottom among other alternatives, and the other open side is closed with the metal lid 5b, among other alternatives, in a rolled manner.

In this embodiment example with the above-mentioned structure, the paper body 1b is completely covered all over with the plastic tube 2b and is preferably water-proof both inside and outside. Therefore, this container is fit for containing juice, and the empty container after use can easily be disposed of through an incinerator, etc.

This embodiment of the invention uses a heat-shrinkable plastic tube and tube wrinkles developed on the body 1b surface during air evacuation will disappear upon heating, thus preventing the container's appearance from being impaired.

Figure 13:
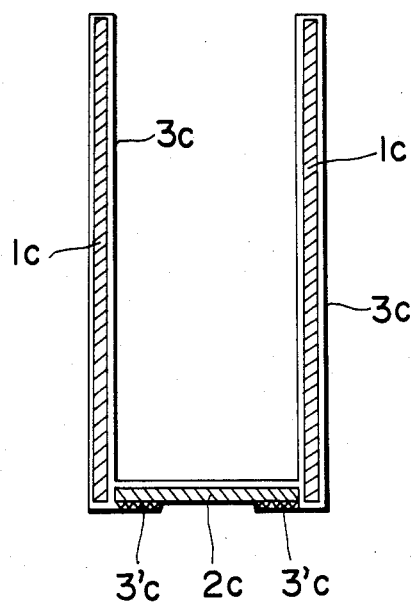
FIG. 13 is a sectional view of a paper container made in the method illustrated in FIG. 12.
Figure 14:
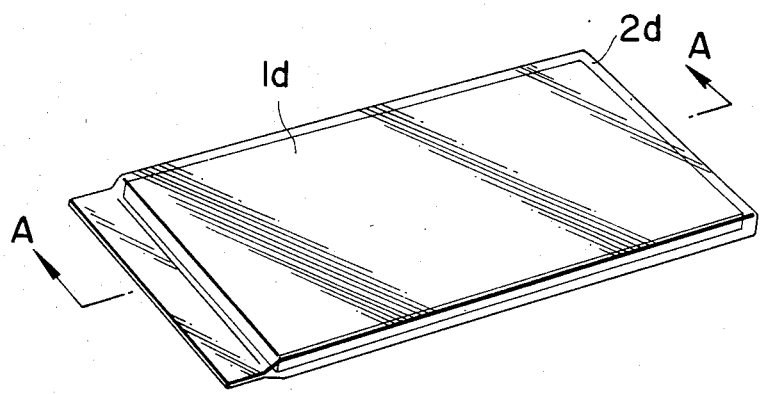
FIG. 14 is a perspective view of a paper plate covered airtightly with heat-shrinkable plastic film.
Figure 15:
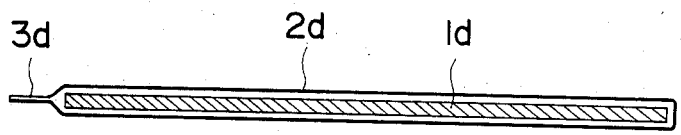
FIG. 15 is a sectional view of FIG. 14 taken on line A—A.

Under this example, a paper tube is inserted into a heat-shrinkable plastic film in the form of a dual tube, the air inside the tube is removed, and the tube is sealed with the clip 3b. Thus the manufacturing process is simple, making it possible to mass-produce the container at lower costs. FIGS. 13–15 illustrate still another embodiment of the invention. FIG. 13 is a sectional view of a paper container of this example. A cylindrical paper body, 1c has a bottom plate 2c, which is also made of paper, inserted into one open mouth of the body 1c. A plastic film 3c covers the paper body 1c and the inner surface of the bottom plate 2c, and edge 3'c of the plastic film 3c is sealed on the outer surface of the bottom plate 2c The sealing of the edge 3'c on the bottom plate 2c may either be effected through heat after forming, for example a polyethylene layer on the outer surface of the bottom plate 2c, or through a sealing agent.

Figure 12:
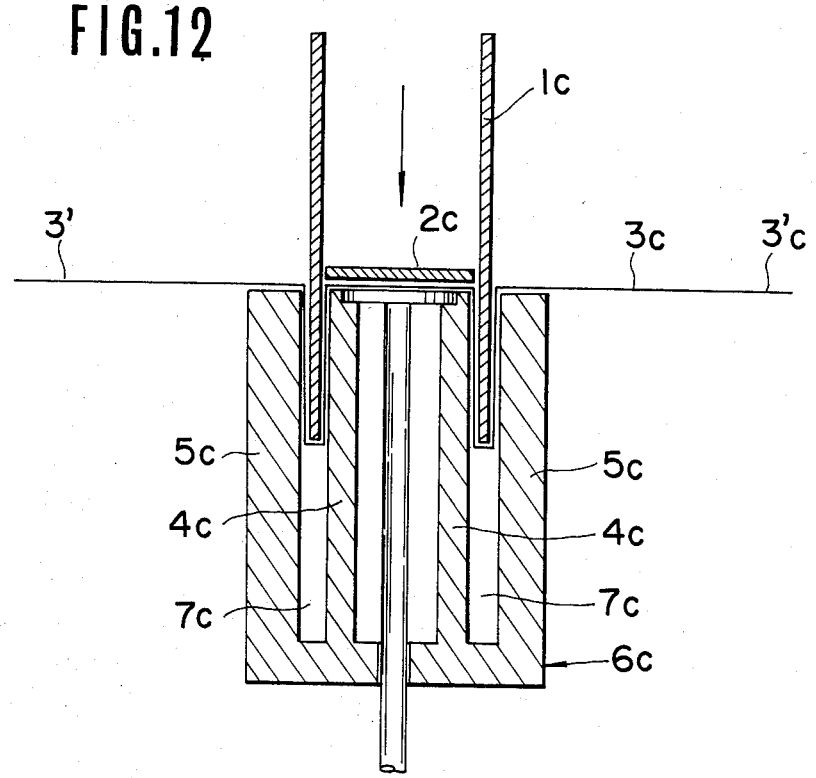
FIG. 12 is a sectional view of a manufacturing method of a paper container of this invention, in which a paper plate is inserted into the bottom of the container.

FIG. 12 depicts one example of the manufacturing method of a container involving this embodiment example. The plastic film 3c is placed on a mold 6c, which is made up of a middle framework 4c and a outer framework 5c, A bottom plate 2c is placed on the film 3c. Then, from above the bottom plate 2c, the paper body 1c is inserted into the channel 7c in the direction of the arrow. Thus, the bottom plate 2c and the inner and outer sides of the paper body 1c are covered with the plastic film 3c, and the edge 3'c of the plastic film 3c is foled back and heat-sealed on the outer surface of the bottom plate 2c.

In manufacturing a container with the above structure, the plastic film 3c to be used is a heat-shrinkable one. If the air inside the plastic tube is removed to the maximum possible extent while the edge 3'c is heat-sealed on the bottom plate 2c, followed by complete sealing, a subsequent heating of the whole paper container will erase film wrinkles on both the inner and outer surface of the container, through film heat shrinkage.

In this embodiment of the invention, a piece of plastic film 3c covers the paper body 1c and the bottom plate 2c. The heat-sealed area is located only on the outer surface of the container, and no cut part of the base material is exposed to air at all, allowing no liquid infiltration through such cut part and no breakage. As FIG. 13 indicates, the container can be produced quite simply at low cost.

Figure 16:
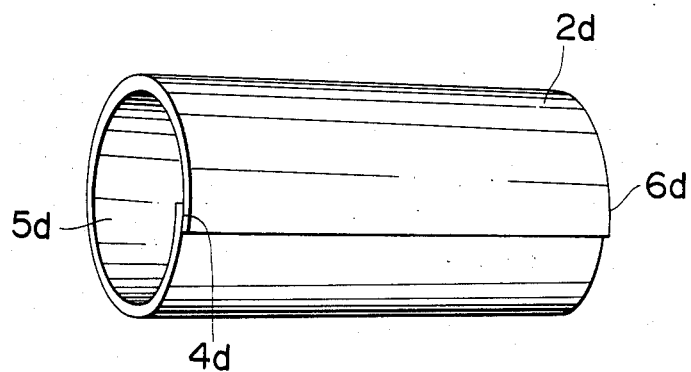
FIG. 16 illustrates the plate of FIG. 14 rolled into a paper container.

FIGS. 14–16 display yet another embodiment example. A paper base material 1d to be formed into a paper tube, and a bag-like heat-shrinkable plastic film covering 2d of the paper base material 1d are combined. As shown in FIG. 15, the air inside the heat-shrinkable plastic film 2d is discharged to the maximum possible extent and the open mouth is heat-sealed at 3d. As FIG. 16 discloses, the film-coated base material is formed into a paper tube and the overlapping area 4d is sealed. After equipping a lid and a bottom to the open mouth 5d and 6d respectively, the container is completed.

Under this invention, a paper-base material, as so far mentioned, is covered with heat-shrinkable plastic film, the air inside the film tube is removed to the maximum possible extent before sealing, and a paper container is formed. Even if a lid and a bottom, both made of metal, are used for the container, most of it is paper, making it easy to dispose of the used empty container through an incinerator, etc.

The paper container, being covered with heat-shrinkable plastic film, allows no infiltration of water content, and can be used for such watery foods as juice and milk.

Not allowing infiltration of water from outside either, this container with a product within can be put directly into a retort pot for hot water sterilization. Thus it is useful for those foods which need sterilization. In case of retort sterilization, hot water causes the heat-shrinkable plastic film to shrink because of heat, adhering further to the surface of the paper tube, leaving no wrinkles and keeping a good appearance of the container.

Besides the above-mentioned merits, this invention provides a paper container which has additional features of lighter weight, better printability, lower cost and higher impact resistance than metal cans.

I claim:

1. A method of manufacturing a container comprising:

covering a paper base member with a heat-shrinkable plastic film having a pair of walls with a space therebetween, the paper base member being positioned between the walls and in the space;

removing air from the space between the walls to pull the walls of plastic film against the paper base member;

sealing at least a portion of the plastic film to close the space in an air tight manner after removing air from the space;

forming the base member into a container shape having at least one open end; and covering the at least one open end with a cover to close the at least one open end of the container shape.

2. A method according to claim 1 wherein the paper base member is in the form of a paper tube, the plastic film is in the form of a plastic tube with a pair of walls comprising an inner wall and an outer wall, the space being annular, and including inserting the paper tube into the annular space until the paper tube is covered by the inner and outer walls of the plastic film at one end of the paper tube forming the at least one open end, and sealing the plastic film at the at least one open end of the paper tube.

3. A method according to claim 2 including covering the at least one open end of the paper tube with a metal lid by rolling an outer periphery of the metal lid with the paper tube and plastic film at the at least one open end.

4. A method according to claim 2 including providing a frame having an inner and an outer frame work defining an annular space with an open end, positioning the heat-shrinkable plastic film over the open end of the annular space, pushing the paper tube into the annular space and over the plastic film to push the plastic film into the annular space and around the paper tube to form the pair of walls, folding over at least a portion of the film at the open end of the annular space and sealing the folded over portion of the film to close the space between the pair of walls.

5. A method according to claim 4 including providing a cover disk on the inner frame work, folding over the portion of the plastic film onto the disk and sealing the portion of the plastic film to the disk.

6. A method according to claim 2 including sealing the space between the pair of walls by clipping an end of the pair of walls together beyond an end of the paper tube.

7. A method according to claim 1 wherein the paper base member is flat and including rolling the paper base member after it is covered by the plastic film to form the container shape.

* * * * *